United States Patent [19]

Murakami

[11] Patent Number: 5,140,473
[45] Date of Patent: Aug. 18, 1992

[54] APPARATUS FOR REPRODUCING DIGITAL AUDIO AND VIDEO DATA

[75] Inventor: Yoshihiro Murakami, Kanagawa, Japan

[73] Assignee: Sony Corporation, Tokyo, Japan

[21] Appl. No.: 438,055

[22] Filed: Nov. 20, 1989

[30] Foreign Application Priority Data

Nov. 29, 1988 [JP] Japan .................. 63-301543

[51] Int. Cl.$^5$ .............................................. G11B 5/02
[52] U.S. Cl. ................... 360/19.1; 358/343; 360/64
[58] Field of Search ............ 360/19.1, 36.2, 13, 360/40, 32, 77.16, 64; 358/343, 310, 182

[56] References Cited

U.S. PATENT DOCUMENTS

| | | | |
|---|---|---|---|
| 4,296,443 | 10/1981 | Sakamoto et al. | 360/77.16 |
| 4,644,400 | 2/1987 | Kouyama et al. | 360/36.2 |
| 4,707,805 | 11/1987 | Narusawa et al. | 360/32 |
| 4,717,972 | 1/1988 | Heitmann . | |
| 4,751,590 | 6/1988 | Wilkinson . | |
| 5,012,361 | 4/1991 | Chiba et al. | 360/19.1 |

FOREIGN PATENT DOCUMENTS

| | | |
|---|---|---|
| 0180445 | 5/1986 | European Pat. Off. . |
| 2092814 | 8/1982 | United Kingdom . |

OTHER PUBLICATIONS

Fernseh and Kinotechnik, vol. 38, No. 7, Jul. 1984, pp. 281-286; J. Heitmann: "Digitale Videoaufzeichnung Grundlagen.Standardisierung.Entwicklung".

S.M.P.T.B. Journal, vol. 97, No. 3, Mar. 1988, pp. 182-193, White Plains, N.Y., U.S.: R. Brush: "Design Considerations for the D-2 NTSC Composite DVTR".

Wireless World, No. 1850, May 1984, pp. 55-58, Sheepen Place, Olchester, GB; J. R. Watkinson et al.: "Variable-Speed Video Playback".

Primary Examiner—Aristotelis Psitos
Assistant Examiner—Joseph P. Kraynak, Jr.
Attorney, Agent, or Firm—Alvin Sinderbrand; William S. Frommer

[57] ABSTRACT

Digital audio and video signals are recorded on successive tracks which extend obliquely formed on a video tape, and reproduced therefrom by reproducing heads which are movable in a direction transverse to the tracks by means of a bimorph device so that a plurality of tracks, corresponding to one field video and audio signals, are skipped in a variable tape speed mode. Tracks provided for the audio signal are arranged at opposite ends of the video tracks. In a mode where the head skips one field, the signal amplitude level of the audio signal reproduced from one end portion of the audio tracks is controlled so as to be gradually reduced and a signal amplitude level of the audio signal reproduced from the other end portion of a different field track portion is controlled so as to be gradually increased so that cross-fading thereof is effected.

4 Claims, 3 Drawing Sheets

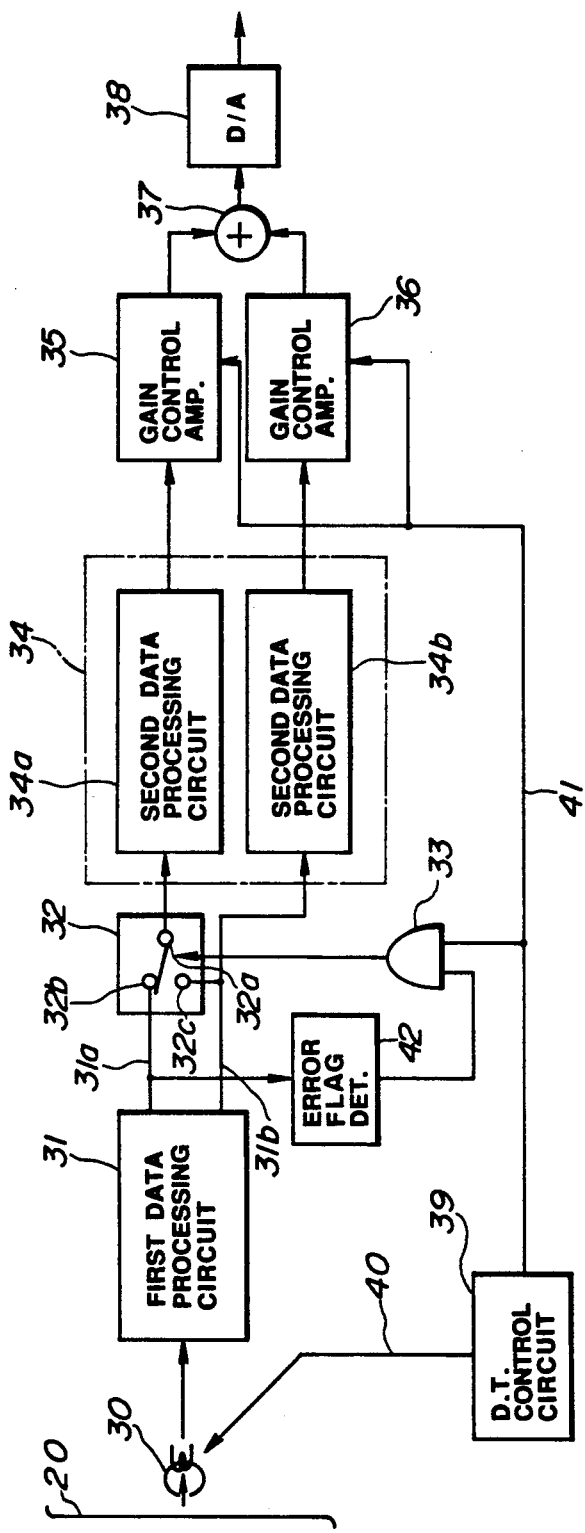
FIG. 5
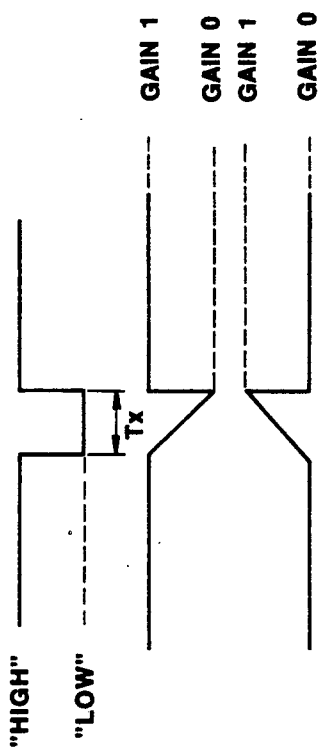
FIG. 6A
FIG. 6B
FIG. 6C

APPARATUS FOR REPRODUCING DIGITAL AUDIO AND VIDEO DATA

BACKGROUND OF THE INVENTION

1. Field of the Invention

This invention relates to an apparatus for variable-speed reproduction of audio and video data by scanning inclined recording tracks with a dynamic tracking head. It is applied for example to a digital video tape recorder utilizing a so-called D1 or D2 format in which digital audio data are dually recorded on the recording tracks.

2. Prior Art

With a so-called D1 or D2 format digital video tape recorder, digitized video and audio data are sequentially recorded on recording tracks T of the magnetic tape 10, which is inclined with respect to the longitudinal direction of the magnetic tape 10, as shown in FIG. 2, for example by a rotary magnetic head device RH as shown in FIG. 1.

The rotary magnetic head device RH shown in FIG. 1 is provided with two pairs of recording heads $A_1$, $B_1$ and $A_2$, $B_2$, arranged at an angular interval of 180° with respect to each other, and two pairs of reproducing heads $C_1$, $D_1$ and $C_2$, $D_2$ arranged at an angular interval of 180° with respect to each other. The two pairs of reproducing heads are arranged orthogonally to the recording heads $A_1$, $B_1$ and $A_2$, $B_2$ as shown in FIG. 1. Furthermore, the recording head pairs $A_1$, $B_1$ and $A_2$, $B_2$ and the reproducing head pairs $C_1$, $D_1$ and $C_2$, $D_2$ are arranged with a height difference corresponding to a width of one track. In the case of the NTSC system, for example, the rotary magnetic head device RH is driven at a rotational speed of 1.5 revolutions per field, thereby recording one-field video data on three sets of tracks $T_1$ through $T_3$ on the magnetic tape 10, as shown in FIG. 1.

Each inclined recording track on the magnetic tape 10 has a central portion as the video region in which video data $V_{11}$, $V_{12}$, $V_{13}$, $V_{21}$, $V_{22}$, $V_{23}$, . . ., for fields $F_1$, $F_2$, . . ., are recorded, and has inlet and outlet sides as the audio region in which time-base-compressed audio data $A_{11}$, $A_{12}$, $A_{13}$, $A_{21}$, $A_{22}$, $A_{23}$, . . . are recorded dually.

For variable-speed reproduction of a tape on which audio data, such as D1 or D2 format audio data, are recorded in a track direction on a block-by-block basis, there has been employed a processing system in which variable speed reproduction is performed with track jumps using a dynamic tracking head and wherein audio signal discontinuities produced by track jumps are compensated either by interpolation, muting, or a processing system in which the rotational speed of the drum and the tape sum ming speed are proportionally changed and all the audio and video tracks are reproduced in which, the audio signals are outputted directly and the video signals are subjected to thinning-out or supplementing operations.

However, the following problems arise when performing variable speed reproduction with a D1 or D2 formatting digital video tape recorder.

That is, with the former mentioned processing system employing a dynamic tracking head, noise may be produced at the junction points upon interpolation; and with the muting operation, voice dropout may be perceived with the latter system in which the drum speed and tape speed are proportionally changed, the reproducing frequency is changed due to changes in the rotational speed of the drum, so that the hardware load is increased as a result of time base processing of the video signals, while the voice pitch is changed. Moreover, to digitally output the voice, it is necessary to perform an operation to change the sampling frequency.

SUMMARY OF THE INVENTION

Accordingly, it is an object of this invention to provide an apparatus for reproducing digital audio and video data which avoids the above-mentioned disadvantages of the prior art.

More specifically, it is an object of the present invention to improve the audio data quality and to simplify the processing when variable speed reproduction is performed on a D1 or D2 formatted digital video tape recorder.

It is another object of the present invention to provide an apparatus in which reproduced audio signals of high sound quality may be produced by relatively simple hardware without having the pitch change during variable speed reproduction.

In accordance with an aspect of the present invention, apparatus for reproducing digital audio and video data recorded in successive parallel tracks which extend obliquely on a video tape and which include digital audio track portions arranged at opposite ends of digital video track portions, the audio digital data recorded in the digital audio track portion at one end portion of each track being also recorded in the audio track portion at the other end portion of an adjacent track so that double recording of the audio digital data is accomplished, comprises: transducing device for reproducing the digital audio and video data recorded in the parallel tracks on said video tape; data processing device connected to the transducing device and processing the reproduced digital audio and video data for extracting therefrom the digital audio data and providing the same with error flag data, and for separating the extracted digital audio data into first and second audio data corresponding to the double recording; device for controlling positioning of the transducing device in a direction transverse to the tracks and including device for generating a skip control signal by which the transducing device is made to skip a number of said tracks corresponding to one field of audio and video data; selection device for selecting one of the first and second audio data in response to the error flag or the skip control signal, respectively; gain control device for controlling gains of the first and second audio data in response to the skip control signal so that amplitude levels of the first and second audio data change gradually in opposite directions; and device for combining the gain controlled first and second audio data so that cross-fading thereof is effected during occurrence of the skip control signal.

For accomplishing the above objects, the same audio data are dually recorded on different inclined recording tracks in the recording regions on a magnetic tape, these inclined recording tracks are scanned by a dynamic tracking head to achieve variable speed reproduction, and the audio data reproduced before and after track jumps are connected together by a cross-fading operation.

The above, and other objects, features and advantages of the present invention will become more apparent from the following description which is made in conjunction with the accompanying drawings.

BRIEF DESCRIPTION OF THE DRAWINGS

FIG. 5 is a block diagram showing the construction of a digital video tape recorder to which the present invention is applied; and FIGS. 6A, 6B and 6C are signal waveform diagrams for illustrating the operation of the digital video tape recorder shown in FIG. 5.

DETAILED DESCRIPTION OF THE PREFERRED EMBODIMENT

Figure 1:
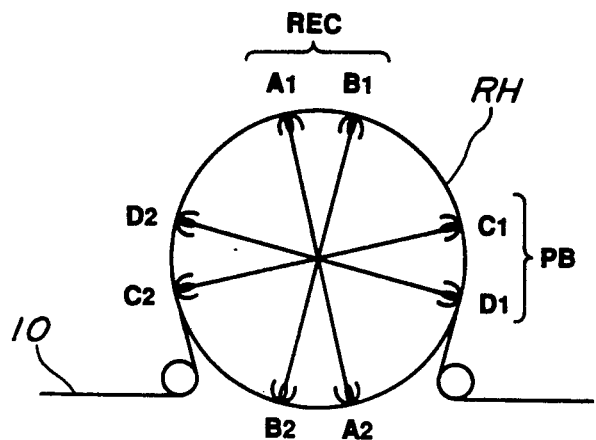
FIG. 1 is a diagrammatic view showing a typical construction of a rotary magnetic head device employed in a digital video tape recorder.
Figure 2:
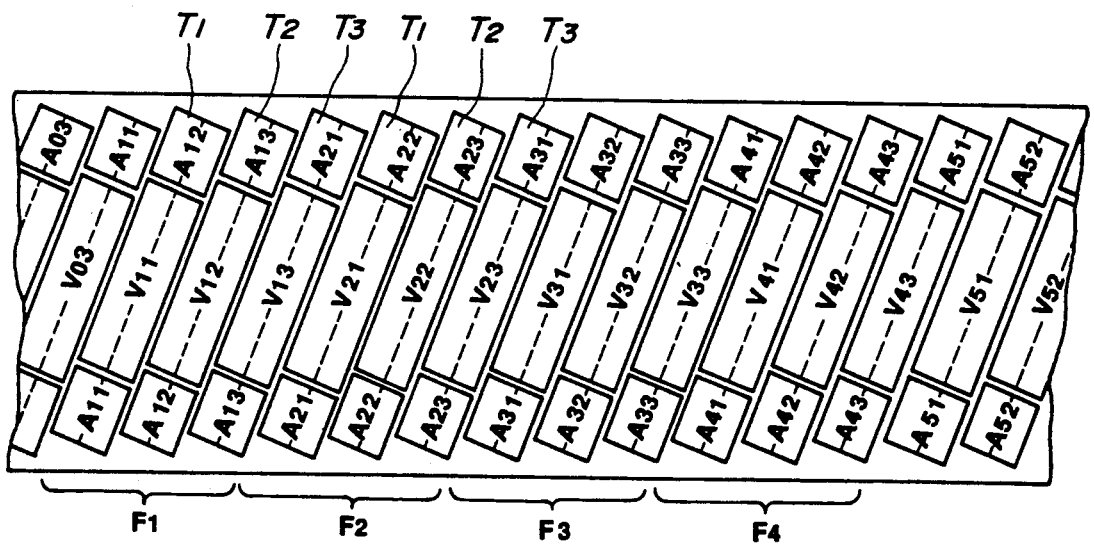
FIG. 2 is a diagrammatic view showing the track format of a digital video tape recorder employing the rotary magnetic head device according to the prior art.
Figure 3:
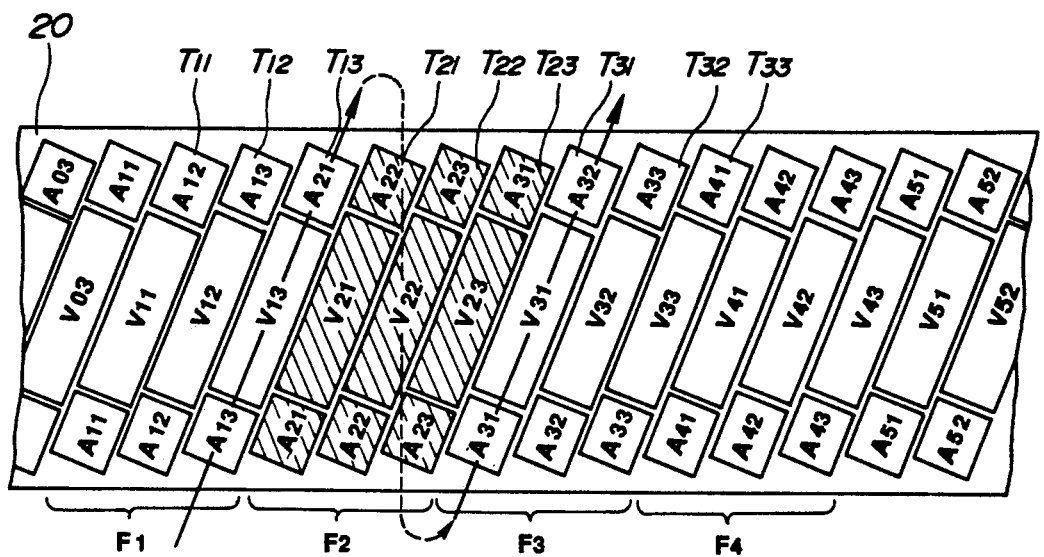
FIG. 3 is a diagrammatic view showing a track format on the magnetic tape and a typical scanning state by the dynamic tracking head when the present invention is applied to a digital video tape recorder to effect double speed reproduction.

In an embodiment which will be explained hereinafter, the present invention is applied to an audio signal reproducing system of a digital video tape recorder having the above mentioned track format as shown in FIG. 3.

In this embodiment of the present invention, a series of audio data or voice data $A_{11}$, $A_{12}$, $A_{13}$, $A_{21}$, $A_{22}$, $A_{23}$, ... are recorded in the audio region at an inlet side of the video region in which video data $V_{11}$, $V_{12}$, $V_{13}$, $V_{21}$, $V_{22}$, $V_{23}$, ... are recorded for fields $F_1$, $F_2$, ...; while the same series of the audio data $A_{11}$, $A_{12}$, $A_{13}$, $A_{21}$, $A_{22}$, $A_{23}$, ... are recorded in the audio region at an outlet side of the video region but with a shift corresponding to one set of the recording tracks.

That is, the audio data $A_{11}$ is recorded in the audio region at the inlet side of the video region of a first set of inclined recording track $T_{11}$ in which a first field video data $V_{11}$ are recorded, while the audio data $A_{12}$ is recorded in the audio region at the outlet side of the video region. The audio data $A_{12}$ is recorded in the audio region at the inlet side of the video region of a second set of inclined recording tracks $T_{12}$ in which the first field video data $V_{11}$ are recorded, while the audio data $A_{13}$ is recorded in the audio region at the outlet side of the video region. The audio data $A_{13}$ is recorded in the audio region at the inlet side of the video region of a third set of inclined recording tracks $T_{13}$ in which the first field video data $V_{13}$ are recorded, while the audio data $A_{21}$, is recorded in the audio region at the outlet side of the video region. In a similar manner, the above series of audio data $A_{11}$, $A_{12}$, $A_{13}$, $A_{21}$, $A_{22}$, $A_{23}$, ... are dually recorded in different recording tracks in audio regions at the inlet and outlet sides of the video region.

Variable speed reproduction with track jumps on a field by-field basis is performed, using a reproducing head for reproducing video data $V_{11}$, $V_{12}$, $V_{13}$, $V_{21}$, $V_{22}$, $V_{23}$... and audio data $A_{11}$, $A_{12}$, $A_{13}$, $A_{21}$, $A_{22}$, $A_{23}$, ... from fields $F_1$, $F_2$, ..., by scanning the inclined recording tracks of the magnetic tape 20 with a dynamic tracking head which may be displaced along the track width due to the provision of a bimorph, for example. The audio data before and after the track jumps are connected together, for example by cross-fading, so as to produce a series of reproduced audio data.

In FIG. 3, there is shown with arrows and a broken line an example of the scanning state of a double-speed reproducing operation in which the inclined recording tracks $T_{21}$, $T_{22}$ and $T_{23}$ of the second field $F_2$, shown by hatching, are jumped over at the point in time when, the scanning of the inclined recording tracks $T_{11}$, $T_{12}$ and $T_{13}$ of the first field $F_1$ is terminated, so as to proceed to the scanning of the inclined recording track $T_{31}$ of the third field $F_3$.

Figure 4:
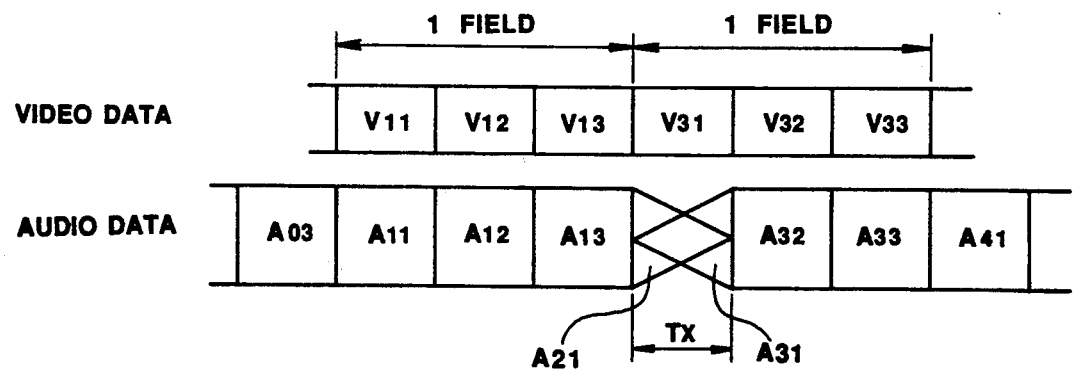
FIG. 4 is a diagrammatic view showing the audio data reproduced after cross-fading.

Then, as shown in FIG. 4, within the first one-third field period after the track jump, that is, within the cross-fading period $T_x$, the reproducing audio data $A_{21}$ and $A_{31}$, that is, the reproducing audio data before and after the track jump, respectively, are connected to form a series of reproduced audio data.

With the reproduced audio data $A_{21}$ and $A_{31}$ connected to each other by cross-fading, the reproduced audio data $A_{21}$ are adjacent to the previously reproduced audio data $A_{13}$, while the reproduced audio data $A_{31}$ are adjacent to the subsequently reproduced audio data $A_{32}$. Therefore, the cross-fading is performed satisfactorily. Moreover, discontinuities of the reproduced audio data occur during the cross-fade period $T_x$ and hence are not obtrusive when heard.

By employing cross-fading for connecting the reproduced audio data before and after track jumps, reproduced audio data of high sound quality may be obtained with relatively simple hardware without the pitch charging during variable speed reproduction. Since the sampling frequency of the reproduced audio data is not changed during variable speed reproduction, the audio data may be outputted as a digital output. De-phasing of audio data caused by the five field sequence may be compensated at the time of cross-fading. The phase at the junction of the reproduced audio data may be adaptively changed by the contents of the reproduced audio data to produce reproduced audio signals of higher sound quality. The construction and the operation will be explained with reference to FIGS. 5 and 6.

Magnetic tape 20, in FIG. 5, has a signal recording format as shown in FIG. 3. The magnetic tape is traced by a reproducing head 30 so that the video signals $V_{11}$, $V_{12}$, $V_{13}$, ... and audio signals $A_{11}$, $A_{12}$, $A_{13}$, ... are reproduced. The position of reproducing head 30 is controlled by a dynamic tracking (DT) control circuit 39. The control of head jump is also performed by the dynamic tracking control circuit 39 which is connected to the reproducing head 30 by wire 40. The video signal and the audio signal produced by the reproducing head 30 are sent to a first data processing circuit 31. This data processing circuit includes an equalizer, a phase locked loop, a Miller square decoder and an inner code correction circuit. The Miller square coding and decoding are described in detail in the U.S. Reissue Pat. No. 31,311. Although the data processing circuit 31 processes both video and audio signals, the present invention relates to the processing of audio signals and hence the description given herein pertains only to the audio signals. The audio signals decoded by the processing circuit 31 and corrected as to the inner code are supplied along with data and error flags to a pair of select terminals 32b and 32c of a switching circuit 32 over wires 31a and 31b, respectively. The track outlet side audio signals shown in FIG. 3 are outputted to wire 31a, while the track inlet side audio signals shown in FIG. 3 are outputted to wire 31b. As mentioned hereinabove in the absence of errors, the track inlet and outlet side signals are identical therefore, no problem is presented with the aforementioned connection. The switching circuit 32 has its stationary contact 32a controlled by the output of an AND gate 33. The stationary contact 32a is connected to the select terminals 32b and 32c, upon a low or high output of AND gate 33, respectively. As mentioned hereinabove, audio data and an error flag is supplied to the wire 31a wherein, the error flag is adapted to be at a high level when an error is produced in the audio data. This error flag is detected by an error flag detection circuit 42 which supplies a "high" signal or a "low" signal to one input terminal of the AND gate 33. The other input terminal of the AND gate 33 is supplied with a signal from the dynamic tracking control circuit 39 which is relatively low only during track jump and relatively high otherwise, as shown in FIG. 6A. Thus, at the time of track jump, the output of the AND gate 33 goes low, whereupon the signal on wire 31a, that is the signal at the track outlet side, is selected by the switching circuit 32. Except during track jump, if an error is produced in the signal on wire 31a, in which the output of the error flag detection circuit 42 is high, the output of the AND gate 33 goes high, whereupon the signal on wire 31b, that is, the audio signal at the track inlet, is selected by the switching circuit 32.

The audio signal thus selected is transmitted to a second data processing circuit 34, which includes an outer code correction circuit and a deshuffle circuit. Although two separate second data processing circuits 34a and 34b are shown in FIG. 5, the data processing operation is performed as a time-divisional operation, wherein only one processing circuit is actually employed. Data processing circuits 34a and 34b are supplied with an output signal from switching circuit 32 and a signal from wire 31b, respectively. The audio signals processed by signal processing circuits 34a and 34b are supplied to gain control amplifiers 35 and 36, respectively. The gain of each gain control amplifier is changed during the time the track jump control signal is at a low level as shown in FIG. 6A. Thus, as shown in FIG. 6B, the gain of the gain control amplifier 35 is changed gradually from "1" to "0" during the track jump period $T_x$. With the gain equal to 1, the input signal is outputted directly, whereas, with the gain equal to 0, no input signal is outputted. Except during jumping, the gain control amplifier 35 has a gain equal to "1", as shown in FIG. 6B. Conversely, the gain of the gain control amplifier 36 is adapted to change gradually from "0" to "1" during track jump period $T_x$, as shown in FIG. 6C. The gain control amplifiers 35 and 36 are controlled by the track jump control signal, shown in FIG. 6A, which is supplied from the dynamic tracking circuit 39 over wire 41. Thus, the amplitude of the output signal from the gain control amplifier 35 is lowered gradually during the track jump period $T_x$ as shown at $A_{21}$ in FIG. 4, whereas the output signal from the gain control amplifier 36 is raised gradually as shown at $A_{31}$ in FIG. 4. The output signals from gain control amplifiers 35 and 36 are summed together in a mixing circuit 37. Therefore, the signal $A_{21}$, which decays gradually during the track jump period $T_x$, and the signal $A_3$, which increases gradually during the same period, are ultimately mixed with each other, that is, cross-faded, as shown in FIG. 4, before being supplied to a digital-to-analog converter 38. It is noted that the arrangement of the present invention shown in FIG. 5 is shown in a hardware block diagram only for assisting the understanding of the present invention, and that, in practice, it is composed of a micro-computer and peripheral circuits, such as additional ROMs and RAMs. It is therefore apparent that the construction, shown in FIG. 5, which includes a micro-computer, is also comprised within the scope of the present invention.

Furthermore, it is to be understood that the invention is not limited to these precise embodiments, and that many modifications and variations could be effected therein by one skilled in the art without departing from the spirit or scope of the invention as defined by the appended claims.

What is claimed is:

1. Apparatus for reproducing digital audio and video data recorded in successive parallel tracks which extend obliquely on a video tape and which include digital audio track portions arranged at opposite ends of digital video track portions, the audio digital data recorded in the digital audio track portion at one end portion of each track being also recorded in the audio track portion at the other end portion of an adjacent track so that double recording of the audio digital data is accomplished, comprising;
   transducing means for reproducing the digital audio and video data recorded in said parallel tracks on said video tape;
   data processing means connected to said tranducing means and processing the reproduced digital audio and video data for extracting therefrom the digital audio data and providing the same with data constituting an error flag which indicates a presence of at least one error, and for separating the extracted digital audio data into first and second audio data which correspond to the double recording and at least one of which contains said error flag;
   control means for controlling positioning of said transducing means in a direction transverse to said tracks and including means for generating a skip signal by which said transducing means is made to skip a number of said tracks corresponding to one field of audio and video data;
   selection means for selecting as its output said first audio data in response to said error flag and for selecting said second audio data either in response to the absence of said error flag or in response to a selection signal generated by said control means in conjunction with the generation of said skip signal;
   first and second gain control means for controlling gains of said output of said selection means and said first audio data, respectively, and acting in response to said selection signal for controlling amplitude levels of said first and second audio data so that said amplitude levels change gradually in opposite directions; and
   combining means for combining the outputs of said first and second gain control means so that crossfading thereof is effected during occurrence of the skip signal.

2. The apparatus according to claim 1, wherein said data processing means, said selection means and said first and second gain control means are constituted by a digital signal processing circuit.

3. The apparatus according to claim 2, wherein said digital signal processing circuit includes a micro-computer.

4. The apparatus according to claim 1, in which said selection means includes an error-flag detection circuit for detecting the error flag.

* * * * *